United States Patent [19]

Arbiter et al.

[11] 4,153,522

[45] May 8, 1979

[54] SULFATE PRECIPITATION DURING OXIDATIVE AMMONIUM LEACH OF Cu, Ni, Zn SULFIDE ORES

[75] Inventors: Nathaniel Arbiter, Vail; Benjamin D. Cooley, Tucson, both of Ariz.

[73] Assignee: The Anaconda Company, New York, N.Y.

[21] Appl. No.: 911,159

[22] Filed: May 31, 1978

Related U.S. Application Data

[63] Continuation-in-part of Ser. No. 805,106, Jun. 9, 1977, abandoned, which is a continuation of Ser. No. 339,332, Mar. 8, 1973, abandoned.

[51] Int. Cl.$^2$ .................. C22B 15/10; C22B 19/24; C22B 23/04
[52] U.S. Cl. .................. 204/106; 204/112; 204/115; 75/103; 75/117; 75/119; 75/120; 423/33; 423/109; 423/150
[58] Field of Search .................. 423/27, 28, 32, 33, 423/36, 42, 150, 109, 166; 75/103, 117, 119, 120; 204/106, 112, 115

[56] References Cited

U.S. PATENT DOCUMENTS

| 648,354 | 4/1900 | Collins | 75/103 |
|---|---|---|---|
| 2,576,314 | 11/1951 | Forward | 423/141 |
| 2,647,830 | 8/1953 | Allen et al. | 75/108 |
| 2,670,273 | 2/1954 | Munn | 423/35 |
| 2,726,934 | 12/1955 | Forward et al. | 423/150 |
| 2,822,263 | 2/1958 | Forward | 75/117 |
| 2,871,116 | 1/1959 | Clark | 75/103 |

OTHER PUBLICATIONS

Forward et al. "Chemistry of the Ammonia Pressure Process for Leaching Ni, Cu, Co from Sherritt Gordon Sulphide Concentrates" in *Journal of Metals*, Mar. 1955 pp. 457-463.

*Primary Examiner*—Brian Hearn
*Attorney, Agent, or Firm*—Pennie & Edmonds

[57] ABSTRACT

In the recovery of copper, nickel or zinc from sulfide ores by leaching with ammonium sulfate solution containing free ammonia in the presence of oxygen to form a leach solution containing dissolved copper, nickel or zinc ammonia sulfate complex, an alkaline metal hydroxide (preferably calcium hydroxide) is introduced into the leaching operation to precipitate the sulfate ion formed and to release ammonia combined therewith as ammonium ion.

9 Claims, 1 Drawing Figure

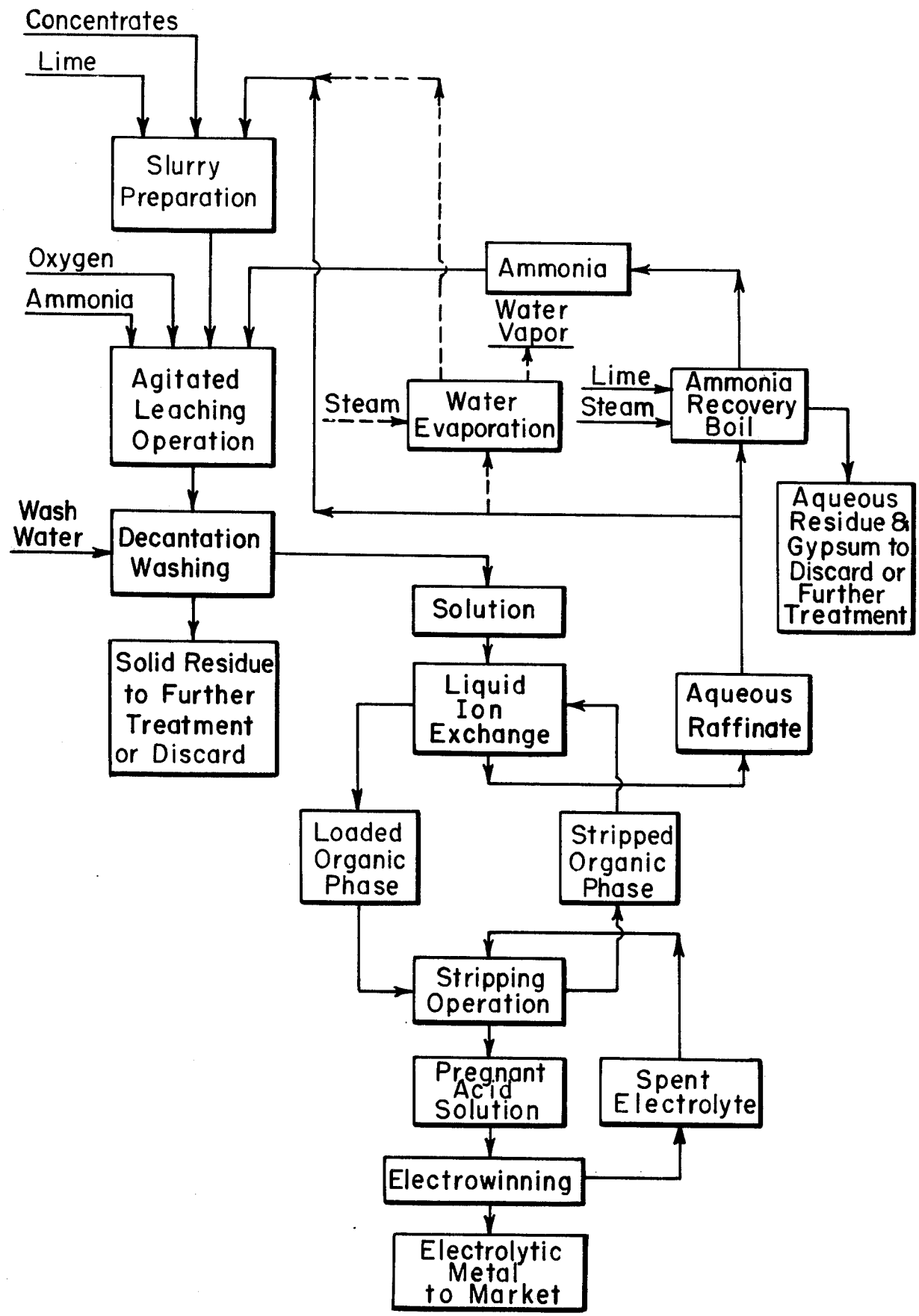

SULFATE PRECIPITATION DURING OXIDATIVE AMMONIUM LEACH OF Cu, Ni, Zn SULFIDE ORES

Cross Reference to Related Applications

This is a continuation-in-part of application Ser. No. 805,106, filed June 9, 1977, which is a continuation of application Ser. No. 339,332 filed March 8, 1973, both now abandoned.

BACKGROUND OF THE INVENTION

The leaching of copper, nickel and zinc sulfide ores and concentrates under pressure with a solution of ammonium sulfate containing free ammonia (ammonium hydroxide) in the presence of oxygen is well known. Such a procedure is described for example in Forward U.S. Pat. Nos. 2,576,314, 2,726,934 and 2,822,263. Recently a process has been developed for leaching such sulfide ores and concentrates at only a few psig (pounds per square inch gauge pressure) with ammonium sulfate solution containing free ammonia and in an oxygen containing atmosphere, by vigorously agitating a slurry of the ore or concentrate in such solution at a temperature from 60° to 100° C. and vigorously recirculating the oxygen to beneath the surface of the slurry.

The basic reaction by which the metal sulfide mineral is brought into solution can be summarized as follows:

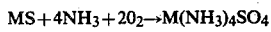

$$MS + 4NH_3 + 2O_2 \rightarrow M(NH_3)_4SO_4$$

Mainly, the sulfur of the dissolved mineral is oxidized to sulfate as the metal constituent is solubilized in the form of a metal-ammonium complex. When the pregnant leach solution is treated to recover the dissolved metal values (e.g., by chemical reduction with hydrogen on carbon monoxide, by electrochemical reduction in an electrowinning operation, or by treatment with an ion exchanger to extract the metal) the sulfate constituent of the complex remains in solution as ammonium sulfate. Economy requires that some provision be made to recover and reuse the gaseous ammonia content of this solution and to separate and discard accumulated sulfate. A well-known procedure for doing so is to treat the residual barren leach solution, after recovery of its metal values, by boiling with lime. Thereby the sulfate ion is precipitated as gypsum, which may be discarded, and the ammonium ion is released as gaseous ammonia which can easily be recovered.

Simple and effective as this lime boil procedure is, it is subject to the serious disadvantage that a large amount of heat is required for it. Indeed, in a complete cyclic process involving leaching, which includes metal recovery from the leach solution, a lime boil of sufficient barren leach solution to eliminate the amount of sulfate dissolved during leaching, and recycling to the leaching operation of the untreated portion of the barren leach solution plus the ammonia recovered in the lime boil, the greatest single energy-consumer is the lime boil operation.

An alternative to the lime boil is to evaporate water from enough of the barren leach solution to crystallize ammonium sulfate in an amount equivalent to the amount of sulfide oxidized to sulfate during leaching. This procedure may in some cases require less heat input than a lime boil, but it is economically practical only when an adequate market exists for the crystallized ammonium sulfate.

So far as we are aware, no other satisfactory alternative procedures for a lime boil operation or an ammonium sulfate crystallization operation have heretofore been proposed for eliminating sulfate dissolved during leaching or recovering the ammonia combined with it.

SUMMARY OF THE INVENTION

The present invention provides, in a process for recovering a metal of the group consisting of copper, zinc and nickel from an ore or concentrate containing such metal in the form of a sulfide mineral, wherein the ore or concentrate is mixed with an aqueous solution of ammonium sulfate containing free ammonia and the mixture is reacted with oxygen, resulting in oxidation of the metal sulfide to the form of a soluble metal ammonia sulfate complex, the improvement which comprises introducing an alkaline earth hydroxide into such mixture prior to completion of the oxidation reaction, whereby an insoluble alkaline earth metal sulfate is precipitated and thereafter separating the aqueous phase containing metal ammonia sulfate complex in solution from the solid phase containing unreacted components of the ore or concentrate and precipitated alkaline earth metal sulfate.

The alkaline earth metal hydroxide may be charged into the leaching operation concurrently with the ore or concentrate or it may be added at intervals of time during the course of the leaching operation. The leaching operation includes both the preparation of a slurry containing the sulfide ore and subsequent leaching of that slurried ore. Preferably the total amount of alkaline earth metal hydroxide which is introduced into the mixture is an amount which stoichiometrically does not substantially exceed the amount of sulfate ion produced in such slurry by oxidation of the sulfide mineral. If some of this sulfate is precipitated by the addition of alkaline earth metal hydroxide at a stage subsequent to leaching, as contemplated in the subject invention, then the amount of alkaline earth metal hydroxide introduced to the leaching operation is correspondingly less. Calcium hydroxide is the preferred alkaline earth metal hydroxide, and it may be added either as dry or slaked lime.

The process of the invention may be carried out either in leaching operations conducted at high pressures, as in the procedure of the Forward patents mentioned above, or it may be carried out in the more recently developed leaching operation conducted at or near atmospheric pressure. In the latter type of process for recovering copper, zinc or nickel from an ore or concentrate containing such metal in the form of a sulfide mineral, the ore or concentrate is subjected to a leaching operation by slurrying it in an aqueous solution containing ammonium sulfate and free ammonia and vigorously agitating the resulting slurry at a temperature in the range from 50° C. to 100° C. and at a pressure not exceeding 10 psig. in the presence of oxygen while vigorously recirculating said oxygen from above the surface of said slurry to a substantial depth below such surface, resulting in oxidation of the metal sulfide to a soluble metal ammonia sulfate complex. In such a process the invention provides the improvement which comprises introducing an alkaline earth metal hydroxide into the slurry prior to completion of the leaching operation, whereby an insoluble sulfate is precipitated, withdrawing from the leaching operation slurry containing said soluble metal ammonia sulfate complex dissolved in the aqueous phase and undissolved residue of the ore or concentrate plus precipitated alkaline earth metal sulfate in the solid phase, and separating said aqueous phase from said solid phase.

The invention particularly contemplates processes of the character described where the aqueous solution containing said soluble metal ammonia sulfate complex, after withdrawal from the leaching operation and separation from the solid phase, is treated to recover dissolved metal values, and residual metal-barren solution containing ammonium sulfate is recycled for use in preparing additional slurry to be leached.

In such a cyclic process, it is usually necessary to introduce water into either the leaching operation or the subsequent solution-solids separation operation, or both of them, for example by adding wash water to the solution-solids separation operation. In order to avoid a build-up in water volume, the invention contemplates treating the solution containing the soluble metal ammonium sulfate complex after it has been separated from the solids residue of the leaching operation and before recycling the metal-barren solution to the leaching operation to eliminate water at a rate approximately equal to the rate of water introduction into the cycle.

Maintenance of this water balance is a critical feature of the invention. That is, excess water added, for example during washing of slurry from the leaching operation, must be removed in order that the volume of metal-barren ammonium sulfate solution recycled to the leaching operation is balanced with the volume of ammonium sulfate solution used to form a first slurry. Failure to maintain such a water balance results in dilute unleached slurries which inhibit the leaching operation and in overflowing of leaching equipment.

Excess water may be eliminated by evaporation, or it may be eliminated by taking a bleed stream from the residual metal-barren solution being recycled and treating the bleed stream with an amount of alkaline earth metal hydroxide (advantageously lime) approximately stoichiometrically equivalent to the amount of ammonium sulfate therein and boiling the thus treated bleed stream to form a gas phase containing ammonia and a liquid-solid mixture containing water, dissolved impurity accumulations and alkaline earth metal sulfate. The ammonia is recovered from such gas phase, and the liquid-solid mixture is discarded from the process.

BRIEF DESCRIPTION OF THE DRAWING

The single FIGURE of the accompanying drawing is a flow sheet showing in sold lines an advantageous embodiment of the process of the invention and in dotted lines, a water elimination operation.

DETAILED DESCRIPTION OF THE INVENTION

In carrying out the process of the invention as outlined on the accompanying flow sheet, conventional flotation concentrates of a sulfide ore of copper, zinc or nickel are slurried with a solution of ammonium sulfate containing usually some free ammonia in an agitated preparation vessel. The concentrates usually are finely ground, say 90% minus 200 mesh; but they may be coarser at the cost of a longer leaching time. No special grinding step need be provided because the concentrates as normally provided will in almost all cases be adequately comminuted. Typical cooper concentrates will contain 20% to 35% copper, usually a like amount of iron, and 25% to 40% sulfur, plus some quantity of insoluble gangue materials such as silica and silicates, aluminates, and the like. The metal values are present in the form of sulfide minerals such as chalcocite, covellite, chalcopyrite, and in the case of copper concentrates, pyrite. Sometimes zinc or nickel sulfides will be present with the copper. In the case of zinc or nickel concentrates, the predominant values will be present as the common sulfide minerals of those metals, usually with copper also present in the use of nickel concentrates, and sometimes with copper or lead sulfides present in the case of zinc concentrates. The particular composition of the concentrates is not of importance so far as the invention is concerned so long as copper, zinc or nickel, or a combination of them, in the form of sulfides, is present.

Sometimes in place of concentrates the charge may be a sulfide ore of one or more of the metals. However, the treatment of ore is less advantageous than concentrates because of its relatively low content of the desired metal values and the consequent greater size of the equipment required for a given amount of metal production.

A solution of ammonium sulfate is initially added to the concentrates to form a first slurry. Thereafter, the ammonium sulfate solution with which the concentrates are slurried is an aqueous recycle liquor recovered from previous use in the process. Typically this solution will contain 60 to 150 g/l (grams per liter) of ammonium sulfate and a small amount (say 2 to 20 g/l) of free ammonia. It will also contain small amounts of thiosulfates and thionates formed in previous leach cycles, and small amounts of impurities leached from the ore in previous cycles (such as arsenic from enargite, cadmium from zinc concentrates, or zinc from copper concentrates). The presence of such impurities is not objectionable as long as some provision is made to eliminate them from the system without allowing for an indefinite build-up of them in the solution.

In accordance with the invention lime or other alkaline earth oxide (or hydroxide) is incorporated into the slurry in the slurry preparation vessel. Lime is preferred for economic reasons, but either barium oxide or strontium oxide may be substituted with equally good or even better technical effect. The lime may be added as dry lime, which has the advantage of not introducing any water into the system; thereby facilitating maintenance of the water balance, but lime may also be added in the form of slaked lime, which is generally cheaper than dry lime, if provision is made to eliminate the water which is present. The amount of lime added during slurry preparation is determined by the amount and composition of the sulfide minerals present in the concentrates, the extent to which these minerals are dissolved during leaching, tank house filled, (if any) and the amount of lime used in a subsequent lime boil of a bleed stream taken from the recycle liquor (if such a lime boil is incorporated in the process). Sufficient lime should be added overall to precipitate as gypsum the amount of sulfur oxidized to sulfate in the leaching operation, but only that fraction of the total lime requirement is added during slurry preparation which is not employed in any later lime boil. This fraction generally will be from 70% to 95% of the total. Usually from 5 to 25 pounds of lime per 100 pounds of a typical copper concentrate will be incorporated into the slurry.

When the sulfide minerals of the concentrates are difficultly or slowly soluble in the leach operation, and the sulfate concentration in the recycle liquor is low, the full stoichiometric amount of lime (relative to the amount of sulfide oxidized to sulfate during leaching) may with advantage not be added to the slurry in the slurry preparation tank. Otherwise the slurry entering the leach system may be too depleted in dissolved sulfate and too high in free ammonia for effective leaching. In that event, it may be desirable to add the lime in increments at successive stages of two leaching operations. But in the usual steady state system in which the amount of dissolved sulfate present in the recycle liquor is substantially more than enough to react with the added amount of lime, then the full required amount of lime usually may be added to the slurry when it is first prepared.

The proportion of solution to solids introduced into the slurry preparation vessel is such as to produce a slurry containing 15% to 25% solids. The slurry is agitated in the preparation vessel to effectively dispense the solids in the solution and keep them dispersed. Slurry preparation is generally at atmospheric pressure, and at the prevailing temperature of the recycle liquor (typically 30° C. to 40° C.).

The slurry then is leached. As noted above leaching may be at high pressures (20 to 200 psig) and at elevated temperatures (80° C. to 150° C.) in an autoclave. Preferably, however, leaching is conducted at or near atmospheric pressure (not above 10 psig) and at temperatures in the range from 60° C. to 100° C. in closed leaching vessels built for operation at or only very slightly above atmospheric pressure. A closed leaching vessel is, of course, necessary to confine the free ammonia, but the vessel need not be of expensive high pressure autoclave construction.

Leaching advantageously is conducted in a series of two or more leaching vessels, in which the temperature progressively is increased as the slurry advances through them. For example, in leaching copper concentrates in a series of five leaching vessels, the slurry temperature may be raised from 60° C. or thereabouts in the first vessel to 80° C. or so in the final vessel of the series. In the case of leaching zinc and nickel concentrates, the progression of temperatures may be higher, say from 70° C. in the first vessel to 95° C. or even 100° C. in the last vessel.

The slurry in each vessel is vigorously agitated, and ammonia gas and oxygen are admitted and vigorously recirculated from the atmosphere over the slurry in each vessel to below the surface of the slurry, for example by means of a subaeration impeller, to insure continuous effective dispersion of oxygen into the slurry.

In the series of leaching vessels the sulfide minerals of copper, zinc and nickel are oxidated to corresponding ammonia sulfate complexes. Pyrite, however, is not oxidized perceptibly and pyrrhotite is only partially oxidized. Thus the iron sulfides not combined with copper or other desired metal values remain for the most part in the undissolved residue.

Owing to the added lime or other alkaline earth oxide, the amount of sulfate that was formed by oxidation of the sulfide minerals in the course of the leaching operation remains in the solid residue as gypsum or other alkaline earth sulfate. Likewise, the amount of ammonia that otherwise would have been tied up in the solid residue as ammonium sulfate with the oxidized sulfur of the minerals is present in the aqueous phase as free ammonia or in the form of a soluble metal ammonia sulfate complex. Thus, lime addition to the slurry prior to completion of the leaching operation has accomplished the same ammonia release and sulfate elimination that would have occurred by subjecting the metal barren leach solution after reduction of the dissolved metal values therein to a lime boil. Yet this is accomplished without the energy consumption that a lime boil would require.

The slurry from the leach operation is decanted and filtered to separate the solids, comprising undissolved components of the concentrate charge plus gypsum, from the pregnant leach solution. This operation is carried out conventionally, using conventional apparatus. Preferably the separation is effected by countercurrent decantation in a series of thickeners, followed by a polishing filter to remove the last of the solids from the solution. The decanted and filtered solids are preferably subjected to countercurrent washing to insure maximum recovery of the dissolved metal values.

The washed solid residue may contain recoverable metal values. For example, the leaching operation may have been conducted to effect recovery in the leach solution of only 80% to 90% of the metal values of the original concentrates. In such case the solids residue may be subjected to flotation concentration to recover these undissolved sulfides and to reject excess pyrite. Alternatively the solids may be treated in any other desired manner to recover whatever values may be present in them.

The pregnant leach solution is advantageously subjected to a liquid ion exchange operation to extract the dissolved copper, zinc or nickel and to leave behind an aqueous solution which is essentially barren of these values, or most of them. The liquid ion exchange operation may be conventionally conducted, using for example a hydroxy oxime dissolved in kerosene, to extract the desired metal or metals from the aqueous solution. The loaded organic ion exchanger then may be stripped of its metal values by treatment with a strong sulfuric acid solution. A stripped organic phase is recycled to extract a further amount of metal values from the leach solution; and the pregnant aqueous acid solution containing the extracted metal values may be treated, as by electrowinning, to recover the metal in form for the market. Spent electrolyte from the electrowinning operation is recycled to the stripping operation for stripping loaded organic ion exchanger of its metal values.

The barren aqueous leach solution, or raffinate, from the liquid ion exchange operation contains ammonium sulfate and some free ammonia, plus excess water added to the process (e.g., with staked lime or as wash water) and impurities dissolved or formed during leaching. This raffinate is the recycle liquor which is returned to the slurry preparation stage for making fresh concentrate slurry for leaching. A major part of this solution may be recycled to slurry preparation without further treatment. However, a small bleed stream from it advantageously is treated with lime or other alkaline earth oxide and is boiled to convert its ammonium sulfate content to gypsum or other alkaline earth sulfate and free ammonia.

Generally from 5% to 20% of the raffinate solution is all that need be taken in the bleed stream, the balance being recycled directly to slurry preparation. The amount of lime added is about stoichiometrically equal to the ammonium sulfate content of the bleed stream. The free ammonia boiled off from the bleed stream is recovered for introuction into the leaching operation. The ammonia-free liquor with the gypsum precipitate dispersed in it is withdrawn from the lime boil operation and is discarded. Excess water added to the system, and impurities collecting in the leach solution during leaching, are eliminated from the system with this discard.

If the amount of impurities collecting in the leach solution is small, the amount of raffinate treated in the lime boil operation may be made very small by subjecting another raffinate bleed stream to a simple evaporation operation to eliminate excess water. Since evaporation in a multi-effect evaporator is usually more economical than a lime boil, it generally is advantageous to treat only the smallest bleed stream possible in the latter operation. In any event, lime addition to the leach operation greatly reduces the amount of raffinate that need be subjected to a lime boil to eliminate water and impurities; and the amount of bleed subjected to such treatment can be minimized by holding to a minimum the amount of water introduced into the system with slaked lime, as wash water, and otherwise.

EXAMPLE

A copper concentrate containing some zinc is treated by a procedure substantially as shown on the accompanying flow sheet. The concentrate assays 23.7% copper, 21.0% iron, 4.7% zinc, 0.5% arsenic, and 32.4% sulfur. This concentrate, about 90% minus 200 mesh (U.S. Standard screen series) in particle size, is mixed with about 20 lb. dry lime per 100 lb. of concentrate and formed into a first slurry containing 20% solids with an aqueous solution containing about 115 g/l ammonium sulfate and about 22 g/l free ammonia. About 22% of the copper content of the concentrate dissolves while the slurry is being formed by agitation in air at atmospheric pressure and 34° C. during a period of about one hour.

The slurry then is fed continuously into the first of a sequence of two leaching tanks, where it is vigorously agitated while gaseous ammonia and commercially pure oxygen gas are admitted. The oxygen is admitted at a pressure of 6 psig, thus establishing this pressure in the leaching vessel. The oxygen-containing atmosphere is vigorously and continuously recirculated to below the surface of the slurry in the leaching vessel by a subaeration impeller mounted in the leaching vessel. The slurry in this vessel is heated to 75° C. by the exothermic dissolution of copper sulfide minerals.

The slurry flows continuously from the first leaching vessel into the second leaching vessel where the temperature and oxygen pressure are the same as in the first vessel and where the same conditions of agitation and gas recirculation prevail. The total residence time of the slurry in the two leching vessels is about 2¼ hours.

At the conclusion of the leaching operation 88% of the copper of the concentrate has been dissolved. The slurry is flowed continuously into and through a series of counter-current decantation thickeners, and the final decanted solution is filtered. During thickening and filtering the leached solids are washed with an amount of water equal to about one third the volume of the leach slurry, resulting in introduction of this amount of water into the system. The washed solid residue assays 3.15% copper, 21.8% iron, 3.60% zinc and 31.4% sulfur. It is treated by froth flotation to recover a concentrate containing about 30% copper, plus most of the zinc of the residue, and may be smelted or otherwise treated to recover these values.

The filtered pregnant leach solution contains 31.0 g/l copper (corresponding to about 87 g/l $Cu(NH_3)_4SO_4$), some zinc, about 85 g/l ammonium sulfate, and very little free ammonia. This solution is treated with a kerosene solution of a hydroxy oxime ion exchanger, whereby substantially all of the copper is loaded into an organic phase and a substantially copper-free raffinate containing substantially all the dissolved zinc, about 115 g/l ammonium sulfate, and 22 g/l free ammonia is produced. About B 70% of this raffinate is recycled directly to the slurry preparation vessel, as a substitute for the ammonium sulfate added to form the first slurry, to slurry additional concentrates, and the remainder is treated with about 97 g/l of slaked lime and boiled to drive off all free ammonia. That ammonia is collected for introduction into the leaching operation as a substitute for that added during the first leaching operation and the ammonia-free liquor with the gypsum precipitate therein is discarded. Addition of further amounts of ammonia and ammonium sulfate during cyclic operation of the system is make-up and merely that necessary to compensate for that which is lost during processing.

In this example the amount of wash water used to wash the leach residue is inordinately high. In most operations with adequately large decantation thickeners a much smaller volume of wash water could be used, and the volume of raffinate that would have to be subjected to the lime boil could be correspondingly reduced. Excess water can be removed from the raffinate by evaporation to avoid overflowing the slurry preparation vessel.

Also in this example no effect is made to recover the zinc. Instead it is kept from building up in the leach solution by being discarded with the solids from the lime boil. However, provision can easily be made to recover it from the raffinate before the latter is recycled to the slurry preparation vessel.

We claim:

1. In a process for recovering a metal of the group consisting of copper, zinc and nickel from an ore or concentrate containing such metal in the form of a sulfide mineral, wherein the ore or concentrate is subjected to a leaching operation by slurrying it in an aqueous solution containing sufficient ammonium sulfate and free ammonia to leach said metal sulfide from said ore or concentrate and vigorously agitating the resulting slurry at a temperature in the range from 50° C. to 100° C. and at near atmospheric pressure in the presence of oxygen while vigorously recirculating said oxygen from above the surface of said slurry to a substantial depth below such surface, resulting in oxidation of the metal sulfide to form a soluble metal ammonia sulfate complex, the improvement which comprises introducing sufficient alkaline earth metal hydroxide into the slurry prior to completion of the leaching operation to precipitate, as an insoluble sulfate, the amount of sulfur oxidized to sulfate in the leaching of the sulfide mineral, withdrawing from the leaching operation slurry containing metal ammonia complex dissolved in the aqueous phase and undissolved residue of the ore or concentrate plus precipitated alkaline earth metal sulfate in the solid phase, separating said aqueous phase from said solid phase, introducing water into at least one of the leaching and aqueous-solids separation operations, recovering the metal from said aqueous phase, recycling a major portion of the residual metal barren aqueous phase containing ammonium sulfate and free ammonia to the leaching operation, without further treatment to remove sulfate in therefrom or regenerate ammonia therein, for making fresh ore or concentrate slurry for leaching, and treating the recycled portion prior to its return to the slurry preparation operation to eliminate water at a rate approximately equal to its rate of introduction.

2. The improvement according to claim 1 wherein the amount of alkaline earth metal hydroxide introduced into the slurry does not substantially exceed the amount which is stoichiometrically equivalent to the amount of sulfate ion produced therein by oxidation of sulfide mineral.

3. The improvement according to claim 1 wherein the alkaline earth metal hydroxide is calcium hydroxide.

4. A process according to claim 3 wherein the calcium hydroxide is introduced into the slurry prior to leaching by adding dry lime to such slurry.

5. The process according to claim 1 wherein 80 to 95% of the barren aqueous phase is recycled to the leaching operation.

6. A process according to claim 1 wherein the solids separated from the solution are washed and wash water is added to the solution.

7. A process according to claim 1 wherein slaked lime is added to the slurry, thereby introducing water into such slurry.

8. A process according to claim 1 wherein at least a part of the water introduced into the leaching and aqueous solids separation operation is eliminated by evaporation.

9. A process according to claim 1 wherein a bleed stream is taken from residual ammonium sulfate solution being recycled to the leaching operation, such bleed stream is treated with an amount of alkaline earth metal hydroxide approximately stoichiometrically equivalent to the amount of ammonium sulfate therein and is boiled to form a gas phase containing the ammonia content of the bleed stream and a liquid-solid mixture containing water, dissolved impurity accumulations and alkaline earth metal sulfate, ammonia is recovered from said gas phase, and said liquid-solid mixture substantially free of ammonia is discarded from the process.

* * * * *

UNITED STATES PATENT AND TRADEMARK OFFICE
CERTIFICATE OF CORRECTION

PATENT NO. : 4,153,522
DATED : May 8, 1979
INVENTOR(S) : Nathaniel Arbiter and Benjamin D. Cooley It is certified that error appears in the above-identified patent and that said Letters Patent are hereby corrected as shown below:

Column 3, line 59, "agitated preparation" should read --agitated slurry preparation--.

Column 8, line 6, "About B 70%" should read --About 70%--;

, line 28, "no effect" should read --no effort--.

Signed and Sealed this

Sixth Day of November 1979

[SEAL]

Attest:

RUTH C. MASON
Attesting Officer

LUTRELLE F. PARKER
Acting Commissioner of Patents and Trademarks